United States Patent
Leonov

(10) Patent No.: US 11,391,131 B2
(45) Date of Patent: Jul. 19, 2022

(54) DOWNHOLE PUMP DRIVE INCLUDING REVERSE REDUCTION GEAR WITH SWITCHING MECHANISM

(71) Applicant: OKLAS TECHNOLOGIES LIMITED LIABILITY COMPANY, Moscow (RU)

(72) Inventor: Vyacheslav Vladimirovich Leonov, Moscow (RU)

(73) Assignee: OKLAS TECHNOLOGIES LIMITED LIABILITY COMPANY, Moscow (RU)

( * ) Notice: Subject to any disclaimer, the term of this patent is extended or adjusted under 35 U.S.C. 154(b) by 39 days.

(21) Appl. No.: 16/608,198

(22) PCT Filed: Sep. 12, 2018

(86) PCT No.: PCT/RU2018/050114
§ 371 (c)(1),
(2) Date: Oct. 25, 2019

(87) PCT Pub. No.: WO2019/013676
PCT Pub. Date: Jan. 17, 2019

(65) Prior Publication Data
US 2021/0102449 A1    Apr. 8, 2021

(51) Int. Cl.
*E21B 43/12*    (2006.01)
*F04B 47/06*    (2006.01)
(Continued)

(52) U.S. Cl.
CPC .............. *E21B 43/128* (2013.01); *F04B 9/02* (2013.01); *F04B 17/03* (2013.01); *F04B 47/06* (2013.01); *F16H 25/122* (2013.01)

(58) Field of Classification Search
CPC .......... E21B 43/128; E21B 4/04; E21B 4/006; F04C 13/008; F04C 15/0061; F04B 17/03;
(Continued)

(56) References Cited

U.S. PATENT DOCUMENTS 3,556,679 A * 1/1971 Middlebusher ......... F04B 49/06
417/63
3,661,205 A * 5/1972 Belorgey ............. G01V 11/005
166/66.4
(Continued)

FOREIGN PATENT DOCUMENTS

RU    2133875 C1    7/1999
RU    147159 U1    10/2014
(Continued)

*Primary Examiner* — Essama Omgba
*Assistant Examiner* — Christopher J Brunjes
(74) *Attorney, Agent, or Firm* — Nixon & Vanderhye PC

(57) ABSTRACT

A downhole pump drive includes a housing, a submersible electric motor and protector, the drive shaft of which is coupled to the screw of a ball screw actuator movably coupled to the housing and is coupled to a rod sealed inside the housing. Interior cavities of the housing communicate with an annular space of the borehole through an elastic shell. The drive shaft of the electric motor is connected to the ball screw actuator via a reverse reduction gear. The reverse reduction gear is switched only when the nut of the ball screw actuator (or of an additional ball screw actuator) arrives at its terminal positions, improving the drive's operational reliability. The electric motor operates in a continuous mode, increasing reliability and energy efficiency of the drive owing to the absence of repeated starting and stopping of the electric motor; consequently, a spike in current intensity upon start-up is avoided.

15 Claims, 2 Drawing Sheets

(51) Int. Cl.
  *F16H 25/12* (2006.01)
  *F04B 17/03* (2006.01)
  *F04B 9/02* (2006.01)

(58) Field of Classification Search
  CPC .......... F04B 47/06; F04D 13/10; F04D 13/08; F04D 13/086; F04D 25/06; F04D 29/044; F16H 25/122; F16H 2025/2087; F16D 2125/20; F16D 2125/58; F16D 28/00
  See application file for complete search history.

(56) References Cited

U.S. PATENT DOCUMENTS

| | | | | |
|---|---|---|---|---|
| 3,801,768 A | * | 4/1974 | Meyer | H02B 13/075 200/253.1 |
| 3,847,507 A | * | 11/1974 | Sakiyama | F04B 49/06 417/22 |
| 3,884,040 A | * | 5/1975 | Green | F16H 25/20 60/593 |
| 4,225,148 A | * | 9/1980 | Andersson | B62D 1/163 114/144 R |
| 5,119,923 A | * | 6/1992 | Jonsson | F16D 35/005 192/70.12 |
| 5,404,767 A | * | 4/1995 | Sutherland | F04B 9/02 166/72 |
| 5,501,580 A | * | 3/1996 | Barrus | E21B 43/128 166/107 |
| 2017/0321695 A1 | * | 11/2017 | Head | E21B 43/128 |
| 2018/0128225 A1 | * | 5/2018 | Kounosu | F02M 59/10 |

FOREIGN PATENT DOCUMENTS

| | | | |
|---|---|---|---|
| RU | 2532641 C1 | * | 11/2014 |
| RU | 2532641 C1 | | 11/2014 |
| SU | 427192 A | | 4/1975 |

* cited by examiner

DOWNHOLE PUMP DRIVE INCLUDING REVERSE REDUCTION GEAR WITH SWITCHING MECHANISM

FIELD OF THE INVENTION

The invention relates to oil producing equipment and can be used to drive submersible well pumps of plunger type used in operation of low-debit wells.

BACKGROUND

There are known submersible pumping units according to patent documents RU2347947; RU2479752; RU2532469; RU2532641; RU2532641; as well as well pumping unit RU2532475.

The disadvantage of these devices is that, a change of the direction of rotation of the rolling screw-nut transmission is effected by changing the direction of rotation of the valve motor by a signal from a ground control station which responds to an increase in power when nut abuts against damper in extreme positions. This, as well as the constant stop of the electric motor, reduces the Efficiency of the plant.

The closest in the technical essence to the invention is the installation of a submersible plunger pump with a rolling screw-nut transmission for lifting a high-depth liquid, including a housing, a submersible motor, provided with hydraulic protection, drive shaft of which is connected to screw of rolling screw-nut transmission, which is in mobile connection with housing and connected to rod of pump plunger. Rod is sealed in housing and is connected with rolling nut by means of cylindrical hollow rod embracing the screw and engaging it into movable joint. Inner cavity of housing is filled with barrier oil. The pump comprises a cylinder with a plunger movably connected to it, and also a delivery valve and a suction valve located on the head of the plunger, and between them there is a cavity communicating with the cavity of the annular space of the well through the receiving grids Mounted in the walls of the cylinder of the plunger pump. Submersible electric motor is made valve-type, and its shaft is connected to the rolling screw-nut transmission screw through the bearing-bearing unit located in the lower part of the housing above the hydraulic protection. The thyratron motor is connected to a control station comprising a controller with firmware (RU147159, IPC F04B47/00, publ. Oct. 27, 2014).

A disadvantage of this installation is that the change of the direction of rotation of the rolling screw-nut transmission is effected by a control station which commands the change of the direction of rotation of the valve motor by signals from the firmware controller. In case of failure of the control station (as a result of deenergized, short-circuit, etc.) The restarting of the pump will not be possible, since the exact position of the plunger in the pump cylinder will not be known, and it will therefore be unknown at which time the direction of rotation of the electric motor is to be switched. Also, due to the constant starts of the stops of the electric motor, an abrupt increase in the current intensity takes place at the moment of start-up. As a result, the efficiency of the plant is reduced.

The proposed invention solves the technical problem of increasing reliability and energy efficiency.

SUMMARY OF THE INVENTION

The essence of the claimed invention is as follows.

The drive of the borehole pump comprises a housing, a submersible motor with a hydraulic protector having a drive shaft connected to a screw of a rolling screw-nut transmission, said transmission is in a movable connection with the housing and is connected to a rod sealed in the housing, internal cavities of the housing are filled with oil and are communicated with an annular space of the borehole through an elastic shell, wherein the drive shaft of the motor is connected with the rolling screw-nut transmission through a reverse reduction gear with a switching mechanism.

According to one embodiment, the switching mechanism consists of a tie-rod coupled with a nut of the rolling screw-nut transmission and the reverse reduction gear. The tie-rod has a lock of extreme positions (end position lock).

According to another embodiment, the switching mechanism consists of an additional screw-nut transmission installed between the rolling screw-nut transmission and the reverse reduction gear, a nut of the additional screw-nut transmission is connected through a pusher with the reversible reduction gear, and the pusher has an end position lock.

According to yet another embodiment, reverse reduction gear is connected with the rolling screw-nut transmission through an elastic coupling.

DETAILED DESCRIPTION OF THE INVENTION

Figure 1:
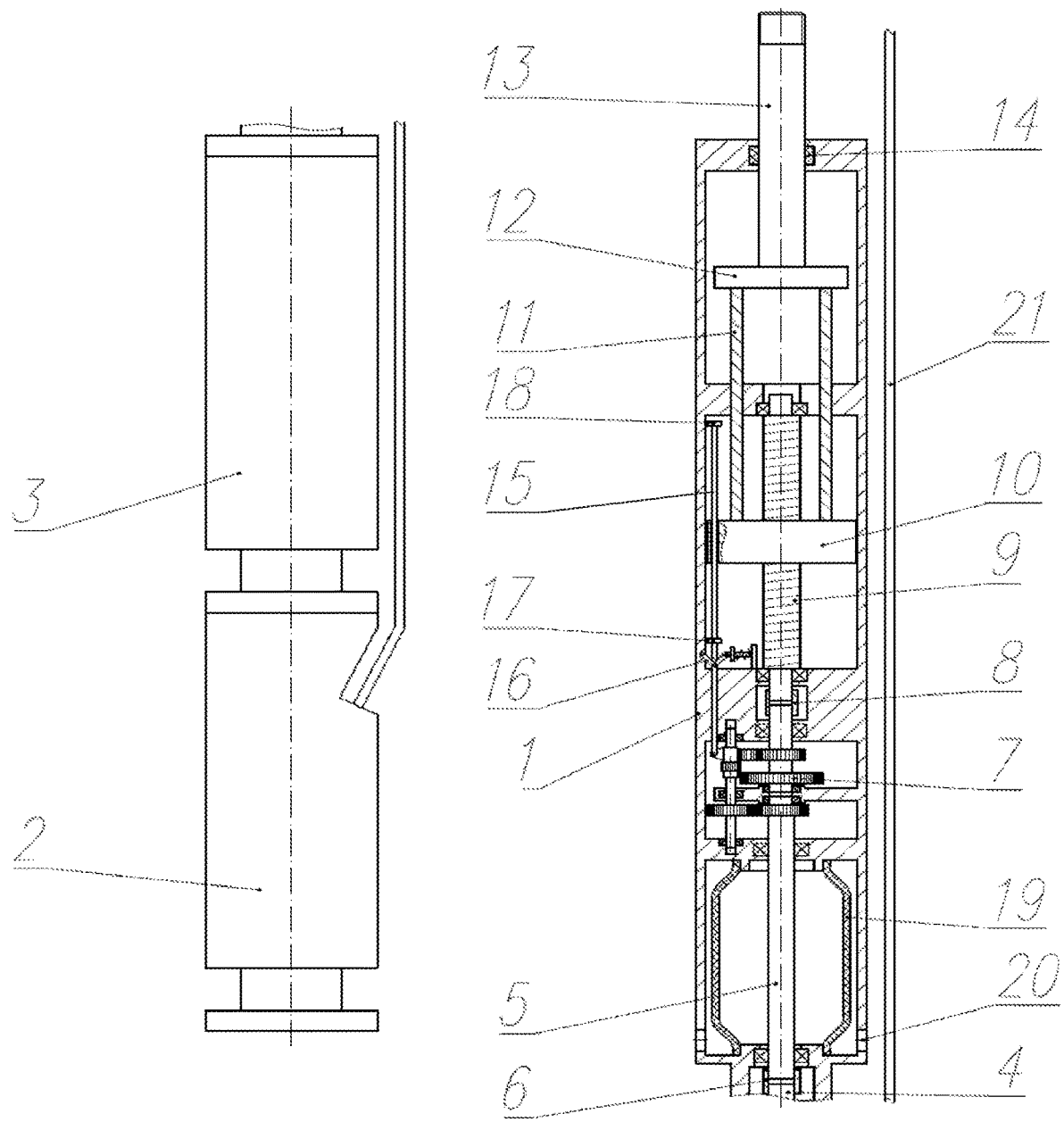
FIG. 1—a downhole pump drive with a switching mechanism in the form of tie-rod.

Downhole pump drive (see FIG. 1) contains housing 1, submersible motor 2 with protector 3. The shaft of the electric motor (not shown in FIG. 1) through shaft 4 of protector 3 is connected with intermediate shaft 5 by clutch 6. Intermediate shaft 5 is connected through reverse reduction gear 7 and clutch 8 with screw 9 of rolling screw-nut transmission. Nut 10 of rolling screw-nut transmission is rigidly connected through hollow rod 11 and centralizer 12 with stem 13 sealed in housing 1 by seals 14.

Tie-rod 15 with retainer of extreme positions 16 passing through hole in nut 10 is arranged along housing. Stops 17 and 18 are made on tie-rod 15.

An elastic shell 19 is installed in the lower part of the housing, the inner cavity of the elastic shell 19 is communicated with the internal cavities of the housing, and the outer cavity is connected with the annular space (annulus) through openings 20.

A cable 21 is used for powering the submersible motor.

Figure 2:
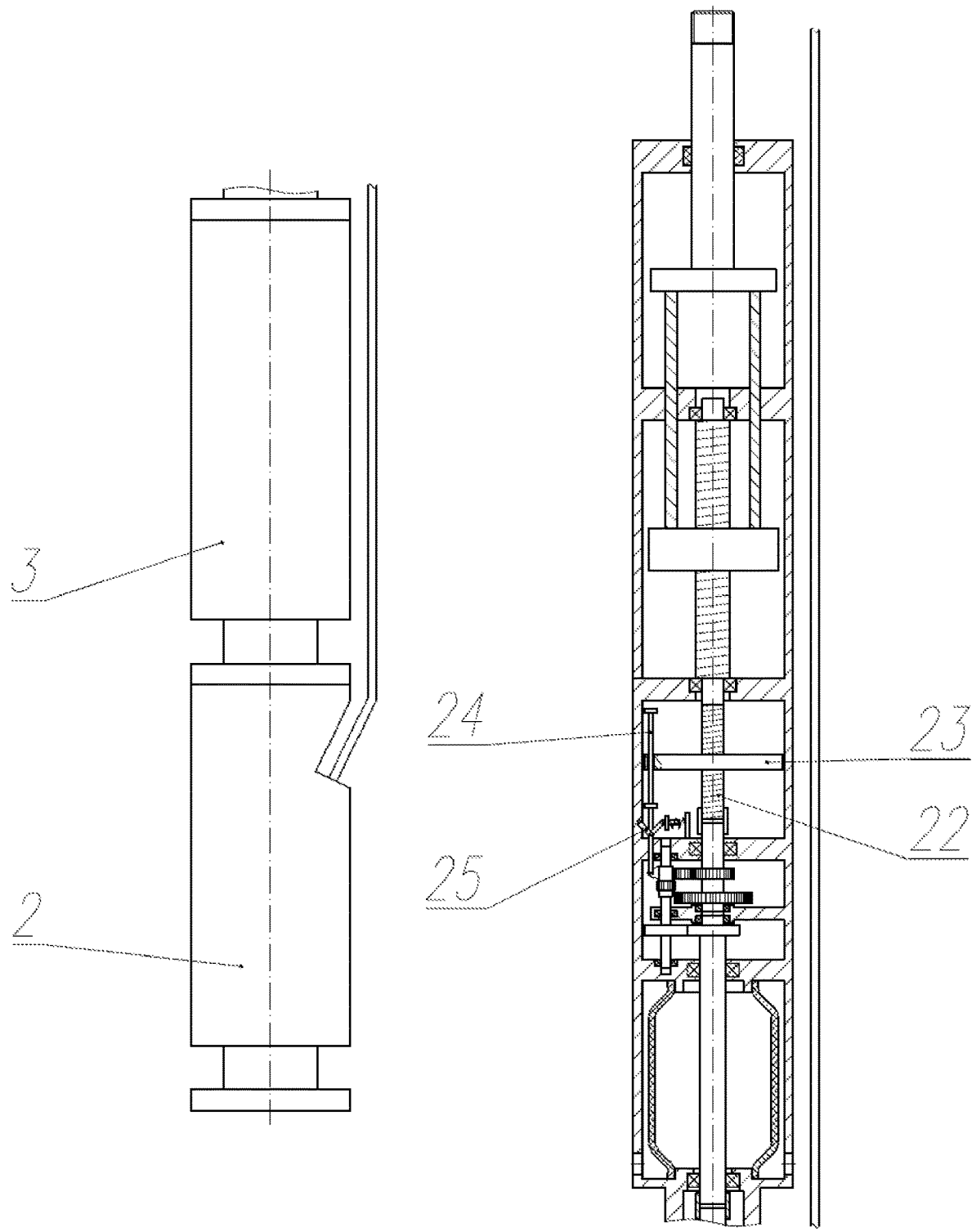
FIG. 2—a downhole pump drive with a switching mechanism in the form of additional screw-nut transmission.

In the downhole pump drive with the switching mechanism in the form of additional screw-nut transmission (see FIG. 2), this additional screw-nut transmission is installed between reverse reduction gear 7 and screw-nut screw 9, the transmission consists of screw 22 and nut 23. Nut 23 is connected by pusher 24 with reverse reduction gear 7. Pusher has end position lock 25.

The downhole pump drive operates as follows.

Downhole pump drive is filled with oil, connected to pump of plunger type, and on tubing string is lowered into borehole. Cable 21 (see FIG. 1) current is supplied to the electric motor 2. The torque from the shaft of the electric motor 2 through the shaft 4 of the protector 3 and the reverse reduction gear 7 is transmitted to the rolling screw-nut transmission screw 9, with the rotation of which, the nut 10 reciprocates. Thereby, the nut 10 transfers the movement through the hollow rod 11, the centralizer 12 and the stem 13 to the plunger-type pump.

When the extreme position is reached, the nut moves due to the stop 17 (for the lowermost position) or the stop 18 (for the extreme upper position)) a tie-rod 15 which switches the direction of rotation of the reverse reduction gear 7. In order to prevent sticking of the switching mechanism in the middle position, when the torque from the electric motor 2 will not be transmitted to the screw 9, the lock of the extreme positions 16 is used, which ensures finishing and fixing of the tie-rod 15 to the extreme position.

In order to maintain constant internal volume of housing 1 at the outlet-closing of rod 13, flexible shell 19 is used, which is compressed at the outlet of rod 13, and during the stroke-unclamping.

The cycle is repeated multiple times over the entire operating time of the actuator.

To exclude large-length rod between reversible reducer 7 and rolling screw-nut transmission, additional screw-nut transmission may be installed, the pitch of the screw 22 is smaller than the pitch of the screw 9, so that the tappet 24 has considerably smaller axial dimensions than the tie-rod 15. The operation of the tappet 24 is similar to that of the tie-rod 15.

The clutch 8 may be resilient (elastic) to avoid shock loads when switching the direction of rotation of the screw 9 of the screw-nut transmission.

A ball-screw or a roller-screw transmission may be used as the rolling screw-nut transmission, which leads to enhanced efficiency.

The submersible motor 2 may be asynchronous, asynchronous with an increased voltage or a permanent magnet motor.

Reverse reduction gear is switched only when rolling screw-nut transmission nut (or nut of additional screw-nut transmission) reaches its extreme positions, which increases the reliability of the drive operation.

The electric motor operates in a constant mode, which improves the reliability and the power efficiency of the drive because there is no repeated start-stop of the electric motor, and hence the abrupt increase of the current intensity at the start of the start is eliminated.

Thus, the solutions used in the invention make it possible to increase the reliability and the energy efficiency of the downhole pump drive.

The invention claimed is:

1. A borehole pump drive, comprising:
a housing,
a submersible motor with a hydraulic protector having a drive shaft connected to a screw of a rolling screw-nut transmission,
wherein said rolling screw-nut transmission is in a movable connection with the housing and is connected to a rod sealed in the housing, and wherein internal cavities of the housing are filled with oil and communicate with an annular space of the borehole through an elastic shell,
wherein the drive shaft of the motor is connected with the rolling screw-nut transmission through a reverse reduction gear with a switching mechanism including a tie-rod coupled with a nut of the rolling screw-nut transmission, wherein the tie-rod has stops and an end position lock,
wherein the reverse reduction gear is connected with the rolling screw-nut transmission through an elastic coupling, and
the reverse reduction gear is rotatable in a direction of rotation that is reversible in response to the nut of the screw-nut transmission contacting one of the stops to move the tie-rod and activate the switching mechanism while the submersible motor operates without repeated starting/stopping.

2. The borehole pump drive according to claim 1, wherein the rolling screw-nut transmission is a ball-screw transmission.

3. The borehole pump drive according to claim 1, wherein the rolling screw-nut transmission is a roller screw transmission.

4. The borehole pump drive according to claim 1, wherein the end position lock is configured hold the tie-rod at an extreme position until the nut of the screw-nut transmission contacts one of the stops to move the tie-rod from the extreme position.

5. The borehole pump drive according to claim 1, wherein the drive shaft of the submersible motor and the rolling screw-nut transmission have a common axis of rotation.

6. The borehole pump drive according to claim 1, wherein the motor operates in a continuous mode.

7. The borehole pump drive according to claim 1, wherein the motor operates in a constant mode without repeated start-stop of the electric motor.

8. A borehole pump drive, comprising:
a housing,
a submersible motor with a hydraulic protector having a drive shaft connected to a screw of a rolling screw-nut transmission,
wherein said rolling screw-nut transmission is in a movable connection with the housing and is connected to a rod sealed in the housing, and wherein internal cavities of the housing are filled with oil and communicate with an annular space of the borehole through an elastic shell,
wherein the drive shaft of the motor is connected with the rolling screw-nut transmission through a reverse reduction gear with a switching mechanism,
wherein the switching mechanism includes an additional screw-nut transmission installed between the rolling screw-nut transmission and the reverse reduction gear such that a first end of an additional screw of the additional screw-nut transmission is connected to the screw of the rolling screw-nut transmission and a second end of the additional screw is connected to the reverse reduction gear, wherein a nut of the additional screw-nut transmission is connected through a pusher with the reversible reduction gear, and wherein the pusher is movable between two end positions and has an end position lock,
wherein the reverse reduction gear is connected with the rolling screw-nut transmission through an elastic coupling installed therebetween, and
the reverse reduction gear is rotatable in a direction of rotation that is reversible in response to the nut of the additional screw-nut transmission reaching one of the end positions while the submersible motor operates without repeated starting/stopping.

9. The borehole pump drive according to claim 8, wherein the rolling screw-nut transmission is a ball-screw transmission.

10. The borehole pump drive according to claim 8, wherein the rolling screw-nut transmission is a roller screw transmission.

11. The borehole pump drive according to claim 8, wherein the end position lock is configured hold the pusher at a first one of the end positions until the nut of the additional screw-nut transmission moves the pusher from the first one of the end positions.

12. The borehole pump drive according to claim 8, wherein the additional screw of the additional screw-nut transmission has a smaller pitch than the screw of the rolling screw-nut transmission.

13. The borehole pump drive according to claim 8, wherein the drive shaft of the submersible motor, the rolling screw-nut transmission, and the additional screw-nut transmission have a common axis of rotation.

14. The borehole pump drive according to claim 8, wherein the motor operates in a continuous mode.

15. The borehole pump drive according to claim 8, wherein the motor operates in a constant mode without repeated start-stop of the electric motor.

\* \* \* \* \*